June 11, 1929.   B. J. ANDERSON   1,716,750
WHEEL FOR JUVENILE VEHICLES
Filed Aug. 3, 1927
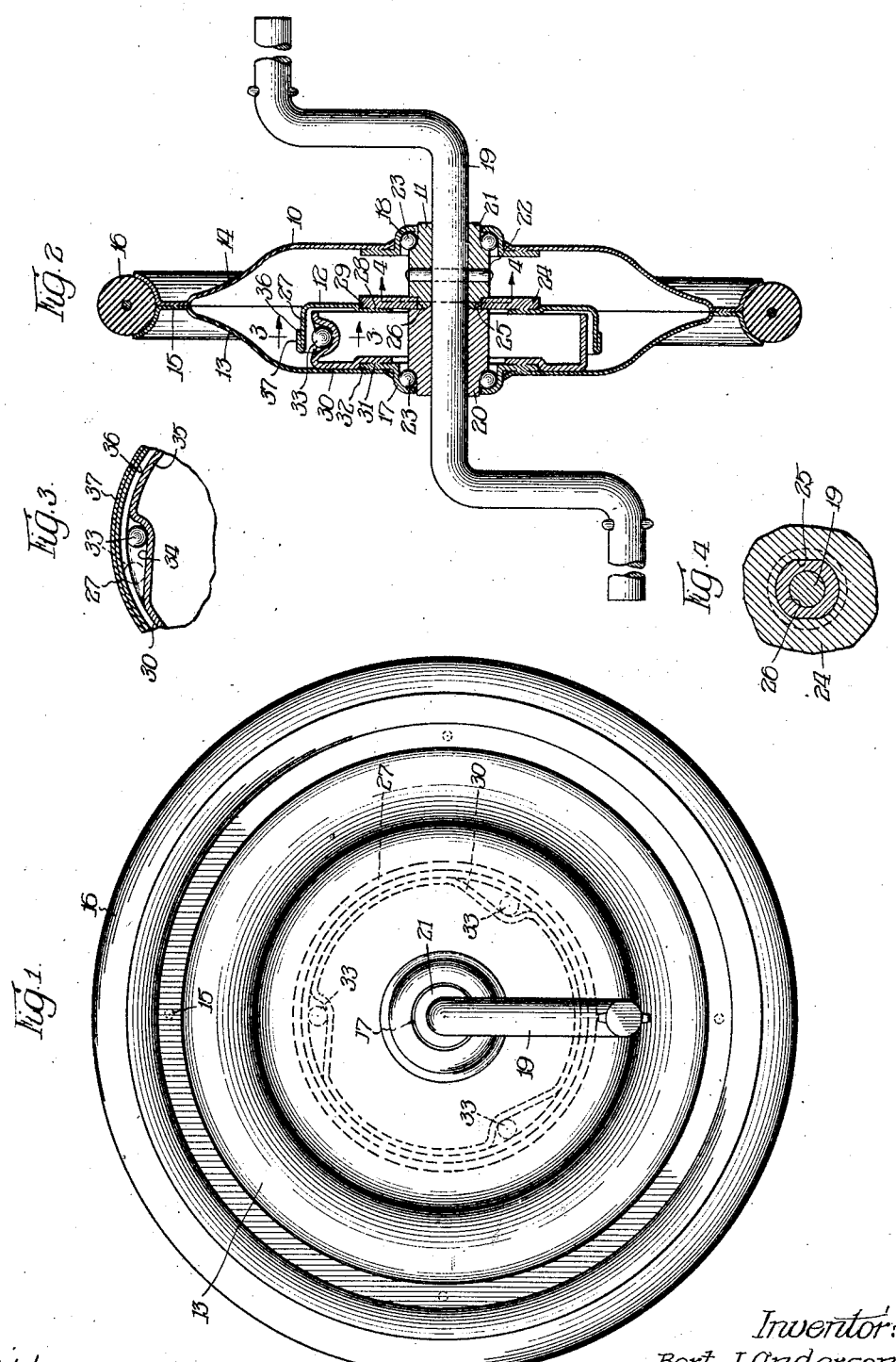
Witness:
A. Burkhardt.
Inventor:
Bert J. Anderson,
By Cromwell, Priest + Warden
Attys.

Patented June 11, 1929.

1,716,750

UNITED STATES PATENT OFFICE.

BERT J. ANDERSON, OF HARVEY, ILLINOIS, ASSIGNOR TO AND-WAY STAMPING COMPANY, OF HAMMOND, INDIANA, A CORPORATION OF INDIANA.

WHEEL FOR JUVENILE VEHICLES.

Application filed August 3, 1927. Serial No. 210,232.

This invention has to do with sheet metal wheels of the type adapted to be applied to juvenile vehicles.

The object of the invention is to provide a sheet metal wheel containing a one-way driving mechanism of novel construction, which mechanism permits the wheel to be used for both pedalling and coasting.

One form of the invention is presented herein for the purpose of exemplification, but it will, of course, be appreciated that the invention is susceptible of embodiment in other modified forms, coming equally within the scope of the appended claims.

In the accompanying drawing:

Fig. 1 is a face view of a wheel constructed in accordance with the invention;

Fig. 2 is a diametric section through the wheel;

Fig. 3 is a fragmentary section, taken on the line 3—3 of Fig. 2; and

Fig. 4 is another fragmentary section, taken on the line 4—4 of Fig. 2.

The wheel illustrated in the drawing includes an outer portion 10, an inner portion 11, and a one-way driving mechanism 12 for causing the outer portion to rotate with the inner portion when the latter is rotated while permitting the outer portion to rotate freely with respect to the inner portion when the latter is stationary.

The outer portion of the wheel consists of two oppositely dished discs 13 and 14 which are welded together at 15, a tire 16 which is seated in a groove formed between the outer peripheries of the discs, and two ball-bearing cups 17 and 18 which are welded to the inner peripheries of the discs.

The inner portion consists of a pedal crank 19, two ball-bearing cones 20 and 21 which are positioned on the crank, and a pin 22 for fixedly securing one of the cones, 21, to the crank.

The outer portion, when rotating with respect to the inner portion, rides on two sets of ball-bearings 23, which are arranged between the cups 17 and 18 of the outer portion and the cones 20 and 21 of the inner portion.

The one-way driving mechanism consists of a plate 24 having a non-circular aperture 25 therein which fits over a correspondingly shaped portion 26 of the cone 21, a cup-shaped sheet metal member 27 which is welded to the plate 24 at 28 and has an annular centering shoulder 29 which seats against the periphery of the plate 24, another cup-shaped sheet metal member 30 which is welded to the cup 17 at 31 and has an annular centering shoulder 32 which seats against the periphery of the cup 17, and a plurality of balls 33 positioned in pockets 34 in the outer portion 35 of the member 30 for wedging engagement with the outer portion 36 of the member 27. The portions 35 and 36 are substantially cylindrical, and the portion 35 fits within the portion 36 in slightly spaced relation thereto. The front sides of the pockets 34 are arranged at a gradual inclination, with the result that, when the member 27 is rotated forwardly by the crank 19, one or more of the balls 33 in the bottom of the wheel will move forwardly and wedge between the inclined sides of the pockets 34 and the opposed surface of the member 27, as shown in dotted lines in Fig. 3, thereby establishing a driving connection between the members 27 and 30, and causing the outer portion of the wheel to be rotated with the inner portion.

When the crank 19, together with the inner portion of the wheel, is held stationary, as in coasting, the rear sides of the pockets 34, which are relatively abrupt, will pick up the balls 33 and hold the same in inoperative positions, thereby permitting the outer portion of the wheel to rotate freely while the crank and inner portion of the wheel remain stationary.

The cylindrical portion 36 of the driving member 27 may advantageously be reinforced opposite the balls 33 by a reversely bent flange 37 which will enable the member to withstand without deformation the wedging pressure exerted by the balls. The driven member 30 is preferably made of heavier gauge sheet metal than the driving member.

The overall dimension between the end faces of the cones 20 and 21 is slightly greater than the overall dimension between the end faces of the cups 17 and 18, with the result that, when the crank is journalled, for instance, in the front fork of a juvenile vehicle of the three-wheel type, the ends of the cups will be spaced slightly from the same, thereby preventing any friction between the outer portion of the wheel and the fork in coasting.

In assembling the plate 24 with the cone 21, the inner end of the cone is preferably swedged outwardly about the crank after the plate has been positioned, whereby to produce a tight connection between the plate and the cone.

The wheel above described functions equally well as a driving wheel and as a coasting wheel. It is light, strong, durable and easy to manufacture, and may be used on juvenile vehicles of various types, including automobiles and sidewalk bicycles.

I claim:

1. A one-way clutch mechanism for a driving wheel, comprising an inner wheel portion, an outer wheel portion journalled on the inner portion, a sheet metal driving member secured to the inner portion, a sheet metal driven member secured to the outer portion, wedge-shaped pockets formed in one of said members, and means in said pockets movable into wedging engagement with the other of said members upon rotation of the inner portion in one direction.

2. A one-way clutch mechanism for a driving wheel, comprising an inner wheel portion, an outer wheel portion journalled on the inner portion, a cup-shaped sheet metal driving member secured to the inner portion, a cup-shaped sheet metal driven member secured to the outer portion with the rim of said driven member nested within the rim of said driving member, wedge-shaped pockets formed in the rim of said driven member, and balls in said pockets movable into wedging engagement between the inclined walls of said pockets and the opposed surface of said driving member upon rotation of the inner portion in one direction.

3. A one-way clutch mechanism for a driving wheel, comprising an inner wheel portion, an outer wheel portion journalled on the inner portion, a cup-shaped sheet metal driving member secured to the inner portion and having a reversely bent rim, a cup-shaped sheet metal driven member secured to the outer portion with the rim of said driven member nested within the rim of said driving member, pockets having inclined front walls and abrupt rear walls formed in said driven member, and balls in said pockets movable forwardly into wedging engagement between the inclined front walls of said pockets and the opposing surface of said driving member upon rotation of the inner portion in one direction.

4. A one-way clutch mechanism for a driving wheel, comprising an inner wheel portion, an outer wheel portion journalled on the inner portion, a cylindrically flanged sheet metal driving member secured to the inner portion, a cylindrically flanged sheet metal driven member secured to the outer portion, wedge-shaped pockets stamped in the flange of one of said members, and means in said pockets movable into wedging engagement with the flange of the other of said members upon rotation of the inner portion in one direction.

5. A one-way clutch mechanism for a driving wheel, comprising an inner wheel portion, an outer wheel portion journalled on the inner portion, a cup-shaped sheet metal driving member secured to the inner portion, a cylindrically flanged sheet metal driven member secured to the outer portion with the flange of said driven member nested within the rim of said driving member, wedge-shaped pockets formed in the rim of said driven member, and balls in said pockets movable into wedging engagement between the inclined walls of said pockets and the opposed surface of said driving member upon rotation of the inner portion in one direction.

In testimony whereof I have hereunto subscribed my name.

BERT J. ANDERSON.